US008806278B2

(12) United States Patent
Hess

(10) Patent No.: US 8,806,278 B2
(45) Date of Patent: Aug. 12, 2014

(54) METHOD AND DEVICE FOR AUTONOMOUSLY DIAGNOSING AND REMOTELY CONTROLLING A COMPUTER OR COMPUTER-AIDED SYSTEM

(75) Inventor: Lord Hess, Heidelberg (DE)

(73) Assignee: Certon Systems GmbH, Heidelberg (DE)

( * ) Notice: Subject to any disclaimer, the term of this patent is extended or adjusted under 35 U.S.C. 154(b) by 1110 days.

(21) Appl. No.: 12/669,729

(22) PCT Filed: Jul. 16, 2008

(86) PCT No.: PCT/EP2008/005796
§ 371 (c)(1),
(2), (4) Date: Jun. 25, 2010

(87) PCT Pub. No.: WO2009/010277
PCT Pub. Date: Jan. 22, 2009

(65) Prior Publication Data
US 2010/0262863 A1 Oct. 14, 2010

(30) Foreign Application Priority Data

Jul. 16, 2007 (DE) .......................... 10 2007 033 346

(51) Int. Cl.
*G06F 11/00* (2006.01)
*G06F 11/07* (2006.01)
(52) U.S. Cl.
USPC ............................... 714/31; 714/26; 717/127
(58) Field of Classification Search
USPC ........ 714/31, 25, 26; 386/240, 155, 156, 157; 717/126, 127, 131; 382/182
See application file for complete search history.

(56) References Cited

U.S. PATENT DOCUMENTS

| | | | |
|---|---|---|---|
| 6,349,393 B1 * | 2/2002 | Cox | 714/38.12 |
| 6,694,455 B1 * | 2/2004 | Scrandis et al. | 714/31 |
| 6,892,332 B1 * | 5/2005 | Gulick | 714/55 |
| 6,970,804 B2 * | 11/2005 | Siegel et al. | 702/182 |
| 7,024,695 B1 | 4/2006 | Kumar et al. | |
| 7,614,043 B2 * | 11/2009 | Ognev et al. | 717/126 |
| 7,644,320 B2 * | 1/2010 | Kawashima | 714/46 |
| 7,954,090 B1 * | 5/2011 | Qureshi et al. | 717/127 |
| 2003/0033466 A1 | 2/2003 | Larson et al. | |
| 2003/0115397 A1 * | 6/2003 | Hawkins et al. | 710/305 |
| 2006/0023384 A1 * | 2/2006 | Mukherjee et al. | 361/103 |
| 2006/0085690 A1 * | 4/2006 | Bolen et al. | 714/39 |
| 2007/0256114 A1 * | 11/2007 | Johnson et al. | 725/139 |
| 2007/0293232 A1 * | 12/2007 | Nonaka | 455/450 |
| 2008/0098357 A1 * | 4/2008 | Candelore | 717/127 |
| 2008/0098432 A1 * | 4/2008 | Hardacker et al. | 725/51 |

FOREIGN PATENT DOCUMENTS

DE 100 07 511 A1 9/2001
WO WO 2006/014400 A 2/2006

OTHER PUBLICATIONS

Anonymous: "certonCHARM flyer", Mar. 2007, pp. 1-2, URL: http://studioraid.com/Info/CertonCHARM.pdf.

* cited by examiner

*Primary Examiner* — Joseph Schell
(74) *Attorney, Agent, or Firm* — Muncy, Geissler, Olds & Lowe, P.C.

(57) ABSTRACT

The invention relates to a method and a device (72) for diagnosing and remotely controlling a host computer (74), in particular a computer which is incorporated in a network and has a local bus (50). The device (72) comprises a network connection (41) via which bidirectional data transmission from the network and into the network is carried out by the host computer (74).

26 Claims, 2 Drawing Sheets

METHOD AND DEVICE FOR AUTONOMOUSLY DIAGNOSING AND REMOTELY CONTROLLING A COMPUTER OR COMPUTER-AIDED SYSTEM

This application is a national stage of International Application No.: PCT/EP2008/005796, which was filed on Jul. 16, 2008, and which claims priority to German Patent Application No.: 10 2007 033 346.5, which was filed in Germany on Jul. 16, 2007, and which are both herein incorporated by reference.

TECHNICAL FIELD

The invention relates to a method and a device for the administration of computers, in particular a method and a device in the field of the remote maintenance of computer-aided systems and fault-tolerant autonomous systems. The solution proposed according to the invention defines an intelligent inexpensive device which autonomously monitors all relevant system properties and functions and independently responds to conditions which could result in hazardous operating conditions. This increases the system availability and simultaneously minimizes the need for human intervention.

PRIOR ART

DE 100 07 511 A1 relates to a method and a device for the remote maintenance of computers with a master-enabled bus. The method known from DE 100 07 511 A1 is implemented in computers with a master-enabled bus, in particular in personal computers (PCs) in which a computer used for maintenance purposes has recourse to the computer to be remotely maintained via a communication network and an interposed control device in order to trigger and control activities in said computer to be remotely maintained. This access operation is effected without software resources of the computer to be remotely maintained, without its bus-connected I/O areas and/or memory areas and/or configuration areas and/or its connections of the control and/or connecting panel which are not connected to the bus. The control device maps address ranges of the computer to be remotely maintained to address ranges of its local bus and provides the remote maintenance computer with said address ranges in a writable and/or readable manner. The maintenance computer accesses the refresh memory of the computer to be remotely maintained in order to render the status and/or activities of the latter visible. Furthermore, the remote maintenance computer accesses connections of the control and connecting panel of the computer to be remotely maintained which are not connected to the bus in order to change the computer to be remotely maintained to the working mode, standby mode, sleep mode and/or off mode and/or to boot said computer and/or to render its status visible.

DE 100 07 511 A1 also discloses a device for the remote maintenance of computers with a master-enabled bus which are, in particular, personal computers. The latter comprise first means which, in addition to a CPU, storage means and a local bus, have a communication interface to a communication network, which can be connected to a maintenance computer, and a master-enabled bus interface to the bus of the computer to be remotely maintained. Second means cause the first means to access the computer to be remotely maintained in order to trigger and control activities of the computer to be remotely maintained from the remote maintenance computer according to the instructions from the remote maintenance computer which are transmitted via the communication network. If necessary, provision is made of third means which connect the first means to connections of the control and/or connecting panel of the computer to be remotely maintained which are not connected to the bus, the second means accessing the bus-connected I/O areas and/or memory areas and/or configuration areas of the computer to be remotely maintained and/or connections of said computer which are not connected to the bus without software resources of the computer to be remotely maintained.

There are a number of parameters which can be used, with suitable monitoring, to protect hardware and data by means of preventive measures. In this case, corresponding preventive measures may be events, for example the early disconnection of power in the event of a cooling infrastructure failing, the early detection of imminent failure of a hard disk, the verification and correct (re)configuration of the BIOS and the like. A further functionality can be seen in the fact that abnormal operating states are automatically detected and corresponding countermeasures are automatically initiated without a system administrator needing to intervene. In the rare cases of hardware actually failing, the device is able to automatically identify and diagnose the malfunction. This allows a detailed fault report to be generated, which anticipates local diagnosis and thus enables failed components to be replaced in a targeted and thus cost-saving manner.

There are a number of products which cover some of the abovementioned functionalities in particular fields. However, this is typically effected only in conjunction with very specific hardware and software implementation which is oriented to the respective terminal.

There are plug-in cards which are able to export the local screen contents to a network via a device. In the case of these cards, the signals from the monitor, keyboard and mouse are exported via a communication channel and thus enable remote access. The abbreviation KVM stands for keyboard, video and mouse and characterizes these plug-in cards. For this purpose, the computer contains a graphics card which can be connected to the plug-in card using an external cable. The signals are generally present in the graphics card in the form of analog signals and must be digitized by the plug-in card in advance. They are then transported to the administrator's workstation via the network using a proprietary, non-published protocol. Further plug-in cards are only able to allow screen export solely when these data have been preprocessed for the serial interface.

The possibility of locally emulating keyboard inputs as a local input via the network is currently achieved by the existing solutions in two different ways: on the one hand, the keyboard output of the computer must be connected to an input of the plug-in card, which makes external cabling necessary; on the other hand, devices and aids may already be present in the computer in which the plug-in card is installed in order to create the IPMI environment therein. However, at present, only a fraction of the computers are compatible with the IPMI standard for reasons of cost.

DISCLOSURE OF THE INVENTION

The present invention is based on the object of increasing the availability of a computer system and simplifying its maintenance.

The invention proposes an autonomously operating device, which is preferably in the form of a plug-in card, as well as a method which can be implemented in this device and is able to operate in any computer-aided system. The device comprises open software interfaces and can therefore be implemented very easily in already existing computers, self-service terminals, automatic machines and maintenance environments. Even requisite, necessary, complete replacement of a computer infrastructure does not change the maintenance infrastructure if the device is installed with the corresponding new hardware.

A multiplicity of technologies and devices which, to some extent, allow at least remote access to computers are available on the market. Plug-in cards which support the IPMI standard are restricted to a few computers and do not provide any active assistance in the event of faults. In the case of the IPMI standard, computers can be switched on and off remotely and monitoring can be carried out. Products from the company Peppercon which likewise have recourse to the IPMI standard in order to be able to develop their full functionality are known. These products generally make it possible to switch the computer on and off remotely, i.e. from a location other than the location at which the computer has been set up and/or installed, and to measure simple parameters, for example voltage or temperature, to a limited extent. In the event of a fault, none of the above-mentioned products becomes active and automatically rectifies faults. In addition, no product which is currently available on the market can incorporate components, which are externally connected to the computer, for example printers or intercoms, in ticket machines and other self-service machines.

In summary, IPMI-compatible cards and KVM plug-in cards expand the keyboard, video and mouse functionalities, without autonomous functionality, for example in order to improve the RAS (reliability, availability, support). The abbreviation RAS stands for reliability, availability and support, which means that the availability of a computer is higher the more comprehensive the quality features or functionalities predefined in the RAS standard or, in other words, the lower the estimated failure probability of such a computer. The device which is proposed according to the invention and is preferably in the form of a plug-in card makes it possible, on the one hand, to remotely access a computer provided with the device which is proposed according to the invention and is preferably in the form of a plug-in card, and, on the other hand, improves the availability of said computer with regard to self-diagnosis of the output of a fault log relating to the switching-on and switching-off operation by repeating start attempts. The device proposed according to the invention autonomously intervenes when a fault or an unstable state occurs or has occurred in the host computer.

The device which is proposed according to the invention, is preferably in the form of a plug-in card and can be easily implemented in PCs, self-service terminals, ATMs with a paying-in or withdrawal function, pay machines, gasoline pumps and the like makes it possible to implement the security standards provided by a VPN. Furthermore, in addition to accessing switch-on and switch-off modes of the relevant terminal with a computer part, the device which is proposed according to the invention and is in the form of a plug-in card also makes it possible to access the operating system (BIOS) of the host computer, that is to say the computer or computation unit into which the device which is proposed according to the invention and is preferably in the form of a plug-in card is inserted, fitted or connected in another manner. The plug-in card makes it possible to restart the host computer, for example; the plug-in card proposed according to the invention may also be implemented as a firewall provided in the form of hardware by being connected to the device which is preferably in the form of a plug-in card by means of suitable cabling of the network in such a manner that all are filtered from the network, for example the Internet, to the host computer in which devices which are proposed according to the invention and are preferably in the form of plug-in cards is recorded, and infection and effective virus or Trojan protection can be ensured.

The information which is transmitted from the computer, provided with the device which is proposed according to the invention and is also preferably in the form of a plug-in card, into the network, for example the Internet, is filtered via the device in the form of a plug-in card. This solution makes it possible, for example, for computation units which are implemented far away from human access, for example pumping stations for gas lines, pipelines or the like which are set up on oil rigs, on wind turbines at sea or in inhospitable areas which can be accessed only with difficulty, to be controlled and monitored by remote access. In particular, faults can be logged, without the need for human intervention, via the device which is proposed according to the invention, can be called an RAS optimizer and is preferably in the form of a plug-in card, and systems can be autonomously restarted if necessary and even repaired independently of the operating system if possible.

BRIEF DESCRIPTION OF THE DRAWINGS

The invention is described in detail below using the drawings, in which.

EMBODIMENTS

Figure 1:
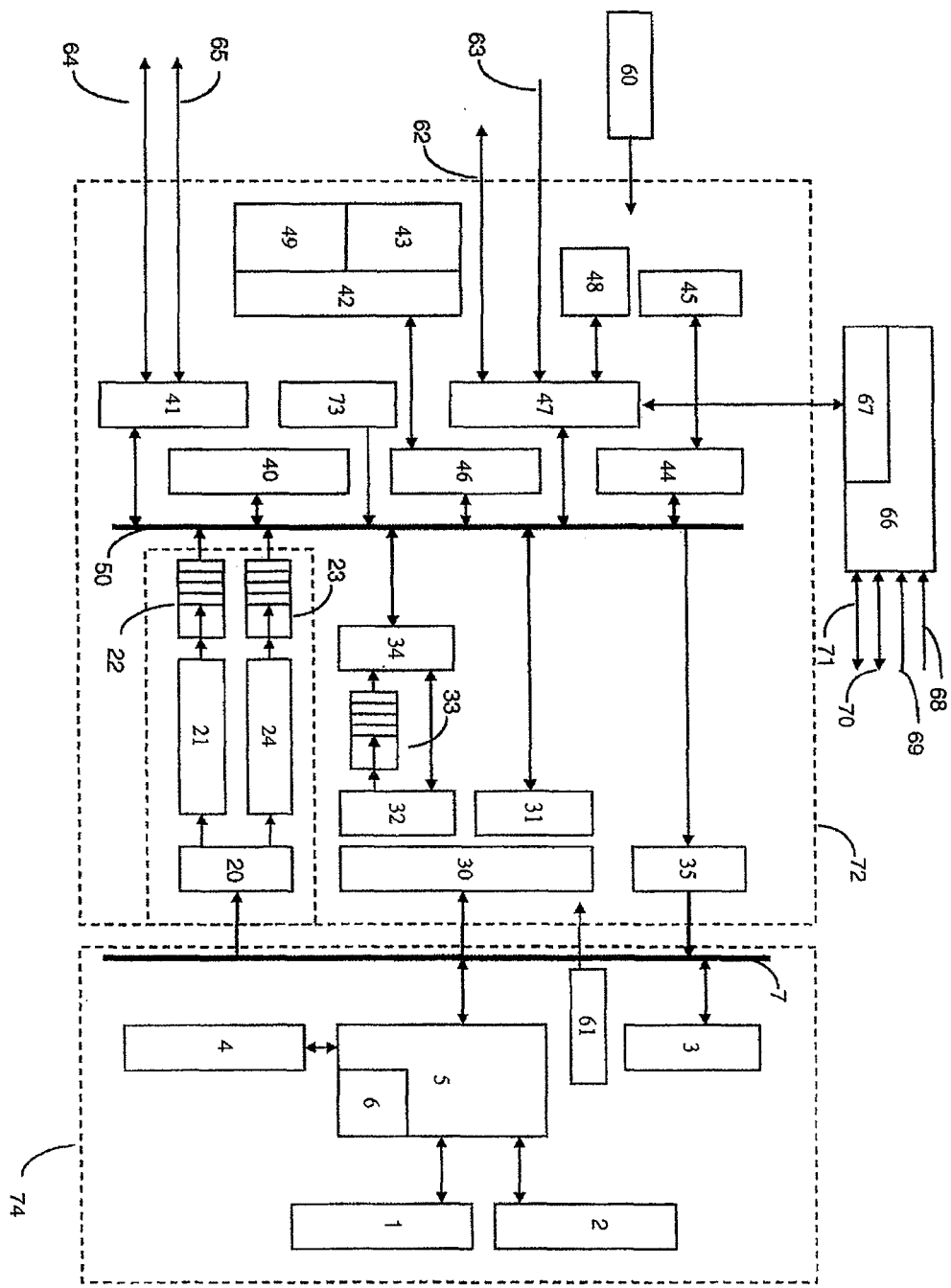
FIG. 1 shows the diagrammatic function blocks of the device proposed according to the invention in the installed state.
Figure 2:
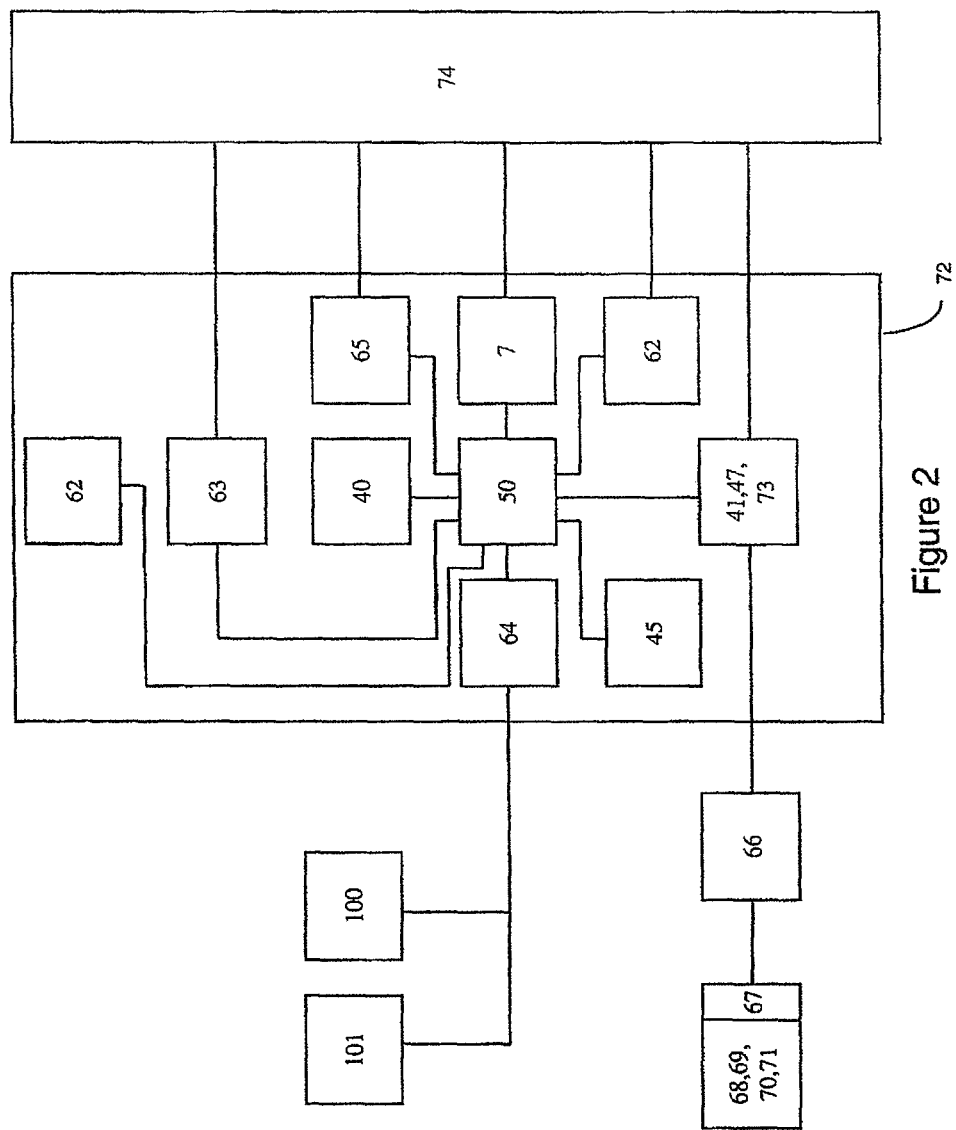
FIG. 2 shows a rougher overview of the individual components of the network.

The function blocks of the device 72 which is proposed according to the invention and is referred to as an RAS optimizer below can be gathered, in a diagrammatic reproduction, from the illustration in FIG. 1. In the illustration according to FIG. 1, the device 72 is integrated in a network, is preferably in the form of a plug-in card and communicates with a host computer 74, a primary network connection 64 for interchanging data, for example with the Internet, and optionally via a secondary network connection 65 for filtering the network, the host computer 74 or for implementing redundant network connections of the plug-in card 72 proposed according to the invention.

An optionally additional graphics card 4, which can be connected via an AGP bus, for example, as well as a main processor 1 and a main memory 2 communicate with the device 72 which is preferably in the form of a plug-in card using a bus controller module 5 which is connected to a bus 7. An optional additional graphics card 3 can be connected to the host computer 74 via the bus 7, which is in the form of a PCI, PCI-X or PCI-Express bus, and can be directly addressed from the device 72 which is preferably in the form of a plug-in card via this bus 7. This local bus 7 is typically both master-enabled and slave-enabled. However, only the slave functionality of the bus 7 is required for the pure KVM and remote maintenance functionality. The master properties of the bus 7 are additionally needed for the extended features, for example the diagnostics of the host system 74, as explained further below.

The plug-in card 72 communicates with the host computer 74 using an interface which is compatible with the bus 7 of the host computer 74 and via a USB master/slave unit 48. The bus 7 enables a plurality of types of communication. Furthermore, a SNOOP unit of the plug-in card 72, which is identified by reference symbol 20, makes it possible for general, non-target-specific transmitted data to be concomitantly read from the bus 7 of the host computer 74 using the plug-in card 72.

Item 30 denotes a PCI, PCI-X or PCI-Express slave unit of the plug-in card 72 which is used to set up bidirectional communication. Item 35 denotes a bus master unit of the plug-in card 72 for the bus 7 of the host computer 74 which is provided by the plug-in card 72 itself. The device 72 which is preferably in the form of a plug-in card can use its bus master unit 35 to assume control of the bus 7 of the host computer 74 and to directly communicate with other devices which are connected to the bus 7 of the host computer 74.

Reference symbol 48 denotes the USB master/slave unit which can be used by the device 72 which is preferably in the form of a plug-in card to simulate any desired USB devices, for example a keyboard, a CD-ROM drive, a mouse, a floppy disk drive and other devices.

A generic input and output unit 47 can be used to connect further components, for example an on/off switch of the host computer 74, a reset switch or a serial connection to the host computer 74 or a serial connection to further standalone systems, for example money detection and money counting systems in self-service terminals, to name one example.

Further service processors or sensors can be connected to the generic input and output unit 47. Reference symbol 41 denotes a network connection with at least one connection which can be used, on the one hand, to connect the device 72 which is preferably in the form of a plug-in card to a network and, on the other hand, to forward data, for example to the network connection of the host computer 74. Reference symbol 60 denotes an external power supply which supplies voltage, for example, to a plurality of internally provided different redundant power supply units 61 inside the device 72 which is preferably in the form of a plug-in card. A processor 40 of the device 72 which is preferably in the form of a plug-in card accesses a non-volatile memory 45 (flash memory), which contains the operating system and the configuration of the device which is preferably in the form of a plug-in card, using the master/slave-enabled bus 7, which is used to interchange data inside the device 72 which is preferably in the form of a plug-in card, and using a drive unit 44.

The bus 7 having master/slave functionality is used to drive all further components of the device 72 which is preferably in the form of a plug-in card via the processor 40, for example a graphics processor 34, and optionally present further sensors 73 which can be arranged in a sensor array in order to connect sensors 68, 69, 70. The sensors 68, 69, 70 and 71 additionally comprise generic interfaces with digital and analog inputs and outputs for connecting any desired sensors 68, 69 in the form of connections for a microphone, a vibration detector, a smoke detector, an acceleration detector, digital and analog temperature sensors and detectors which can indicate, for example, a "housing was opened" state, sensors for recording the fan speed, noise sensors, for example microphones, vibration sensors and the like; and also an interface 70 for transmitting and receiving IPMI data and control sequences and, indicated by reference symbol 71, at least one connection for recording the fan speed and intervening for regulatory purposes if necessary. Data which are read in via the SNOOP unit 20 of the device 72 which is preferably in the form of a plug-in card can be distinguished by type in a tracer unit 21 and a filter 24 and are then stored via a first-in/first-out port 22 and a first-in/first-out port 23, respectively assigned to the tracer unit 21 and the filter 24. The tracer unit 21 of the device 72 which is preferably in the form of a plug-in card is used to be able to read commands, data and addresses which are not intended for the device 72 which is preferably in the form of a plug-in card from the bus 7 of the host computer 74. The filter 24 has the task of being able to read and evaluate generic fault messages from the host computer 74.

As already mentioned, the data distinguished by data type in the tracer unit 21 and the filter 24 are stored in the memories 22, 23 (FIFO principle) and are retrieved from there by the CPU (processor 40) at corresponding clock times and are evaluated. The processor 40 can access a drive unit 46 of a volatile memory 42, which represents the main memory, via the master/slave-enabled local bus 50.

The graphics unit identified by reference symbol 34 receives image data via the PCI, PCI-X or PCI-Express slave unit of the device 72 which is preferably in the form of a plug-in card as well as configuration data from the control and status register 33 (FIFO for graphics data). The graphics processor 34 of the device 72 which is preferably in the form of a plug-in card complies with all common graphics standards (VGAS, VGA and others). The image data are evaluated in the processor 40 and are converted into possible fault displays for export from the network (Ethernet, intranet or Internet) via the network connection 41.

In order to allow generic intelligent administration of a network or a computer, it is desirable to define an interface for the administrated hardware, which interface operates independently of the hardware to be administrated and has a minimal influence on the operation of the hardware. The most important functions which must be accessed in this case are the screen output, the keyboard and inputs which are made using the mouse, system reset signals, on/off signals and different sensors for measuring voltage, temperature, power consumption, supply voltage, fan speed, noises and other sensors at different locations inside the administrated system, for example an ATM with a paying-in and/or withdrawal function, as is set up in financial institutions and publicly accessible locations, point-of-sale terminals in supermarkets, point of sale systems in gas stations, oil rigs, wind turbines at sea or on land, remote pipelines, pumping stations, gas compressor stations etc.

The graphics functionality is particularly important in this case in order to ensure the monitoring and control of operations of the operating system of the host computer 74 or of the basic I/O system (BIOS) in the flash memory or non-volatile RAM in the computer-aided system. In this case, a resident graphics card is used in the PCI, PCI-X or PCI-Express bus device as a preferred implementation. The keyboard and mouse functionalities are implemented in the form of a USB subsystem with minimal influence. Many of the system parameters can be obtained by reading a desktop management interface (DMI) data structure; additional sensors in the device 72 which is preferably in the form of a plug-in card may be kept for a guaranteed and extended functionality.

The device 72 which is proposed according to the invention and is preferably in the form of a plug-in card may be in the form of a single-board computer (SBC) 66, for example. In this case, the intelligent and autonomous device 72 comprises a complete single-board computer 66 under an operating system, for example Linux, which may be provided with a non-volatile memory 45 (flash memory) and has an Ethernet interface as a primary external interface. In addition to Ethernet, it is also possible to implement a number of further other external connection protocols, for example ISDN, GPRS, etc. The processor 40 boots with the aid of the drive unit 44 of the non-volatile memory 45 and initializes the volatile main memory 42 and its drive unit 46. After a successfully completed hardware self-test and a full boot process, all corresponding necessary software processes are started and requests for one or more Ethernet connections are answered.

The device 72 which is preferably in the form of a plug-in card can likewise provide the host computer with a BIOS ROM 49 (virtual boot flash). In this case, the content of this BIOS ROM 49 (virtual boot flash) is a reserved memory area in the volatile memory 42 (dynamic memory) which is controlled by the drive unit 46 (already mentioned).

The host computer 74 which accommodates the device 72, which is proposed according to the invention and is preferably in the form of a plug-in card, comprises an interface which is provided by the bus 7. The device 72 which is preferably in the form of a plug-in card comprises a set of registers which are used to communicate with the host computer 74. A plurality of parameters of the host computer 74, for example the system load level, the rate of page faults (page fault rate) which have occurred in the memory 2 of the host computer 74 and similar further data, are not directly available. Although these parameters can be recorded by the operating system of the host computer 74, it is more expedient to manage and evaluate these parameters together with the device's own sensor data. The necessary communication between the device 72 which is preferably in the form of a plug-in card and the host computer 74 requires device drivers which operate in the host computer 74 and are thus dependent on the respective operating system used. There are different possible ways of ensuring this; starting from a simple mailbox principle, via the implementation of a virtual network, to the implementation of an encrypted private local network and a software process which responds to the network requests. All methods interrogate the values at particular intervals of time in order to detect a failure in the host computer 74 as promptly as possible and in order to be able to automatically initiate steps which rectify the faults. The Ethernet protocol is implemented for the primary remote access in the device 72 which is preferably in the form of a plug-in card. In this case, access to the device 72 which is preferably in the form of a plug-in card is ensured using software-internal security mechanisms and standardized security mechanisms. The device 72 which is preferably in the form of a plug-in card is generally installed behind firewalls and can be directly addressed only with difficulty. In order to ensure the currently highest security standard, the plug-in card 72 allows IP packet filters for restriction to particular MAC addresses to be supported. An encrypted VPN tunnel (communication protocol for encrypting data) is provided for remote access, the plug-in card 72 as the client setting up the connection to a defined server. As an additional security aspect, this connection does not permanently exist but rather can be initiated if necessary or can be set up at previously exactly defined times.

In order to ensure the full functionality of a computer-aided system, a control and status register 32 is needed for the bus 7 of the host computer 74, which register is provided for the graphics unit 34 by the device 72 which is preferably in the form of a plug-in card. There is also a memory 33 which manages graphics data according to the first in/first out principle as well as the graphics processor 34 of the plug-in card 72. The graphics card should be respectively identified by the BIOS (basic I/O system), in which case a minimum functionality is supported, for example at least the VGA graphics standard. The solution proposed according to the invention with its optional functionalities implements at least the VGA standard as the graphics standard and uses the generic bus interface 30 to the PCI, PCI-X or PCI-Express slave unit of the device 72 which is preferably in the form of a plug-in card. In this case, the focus of the graphics support is not so much the speed and functionality of the graphics adapter as the simple remote access and the highest possible detection rate inside the host computer 74. For this reason, a special graphics memory is not implemented in the device 72 which is preferably in the form of a plug-in card but rather an area of the volatile memory 42, that is to say an area of the main memory, is used for the graphics data. Each PCI-, PCI-Express- or PCI-X-triggered operation for accessing that area of the volatile memory 42 in which the graphics data are stored crosses the local master/slave-enabled bus 50 for interchanging data inside the device 72 which is preferably in the form of a plug-in card and thus constitutes an operation for accessing the volatile memory 42, that is to say the main memory 42. In order to avoid conflicts, these access operations are controlled using a regulating unit 46, for example the drive unit of the volatile memory 42, and are administrated accordingly.

The entire set of graphics control registers 33 is implemented as part of a PCI, PCI-Express or PCI-X subsystem for incorporation in the bus 7 of the host computer 74. A minimum amount of hardware is needed to execute the graphics commands. The commands or instructions are received by the graphics CSR (control and status register for driving and reading hardware components) and are processed by the processor 34, that is to say the graphics processor. On the one hand, the CPU of said processor generates the corresponding update for the graphics memory 43 which is implemented as an area inside the volatile main memory 42. On the other hand, a message queue is maintained with abstract commands, which queue informs the processor of the plug-in card 72 of possible changes in the graphics and keeps the processor updated. In order to increase the speed for graphics write access operations, a plurality of graphics commands may be combined and may be forwarded to the PCI, PCI-Express or PCI-X bus unit 7. In order to optimize the read access operations, the respective data last read from the graphics memory 43 are buffered by the graphics processor 34 with corresponding address locations (cache mode).

The graphics memory area 43, which is implemented as an area inside an area which is intended only for graphics inside the volatile memory 42, can also be remotely accessed, for example by implementing small server protocols, VNC or a remote desktop. The VNC server in the plug-in card 72 uses the graphics memory area 43 like a graphics buffer and exports the screen contents to any standard VNC client or the remote desktop.

In order to have complete control over the host computer 74, in particular access to the basic I/O system (BIOS), it is necessary for the keyboard and the mouse of the host computer 74 to be able to be controlled. In this case, it is possible to select from a number of possible interfaces, for instance a PS/2 standard or direct access to the corresponding control and status register CSR structures inside the host computer 74. At least the last-mentioned method may result in problems since the interface of the basic I/O system (BIOS) cannot be switched off if the keyboard is not connected. Very general and widespread USB input interfaces are currently supported by current computers. In this case, the keyboard and mouse commands are received, for example, by a VNC client and are forwarded to the VNC server and the corresponding USB device driver. The USB interface 48 of the device 72 which is preferably in the form of a plug-in card is connected in this case to a USB interface of the host computer 74 using an internal or external jumper cable or directly. In order to support one or more USB multifunction devices, at least one USB interface is required in this case.

The USB standard allows connections with the possibility of adding further dynamic devices or removing devices which are no longer required at any time. For example, a virtual USB mass memory or a CD-ROM/DVD drive may be dynamically added to the system by means of the plug-in card 72, the corresponding device functionality being activated on the plug-in card 72. The data from the device which has been added are provided as a file, which is on another server 100, which collects and can display information relating to a plurality of devices 72 which are preferably in the form of a plug-in card, within the administration network, and are available to the device 72 which is preferably in the form of a plug-in card via the primary network connection 41 for interchanging data, compare item 64. A monitoring system which manages a plurality of decentralized devices 72 which are preferably in the form of plug-in cards is provided, for example, in the administration network. The fault logs of said devices which are possibly transmitted are stored therein and are updated in other plug-in cards 72 which are installed in other computer systems inside the monitoring system, with the result that a system which learns from individual fault logs from individual plug-in cards 72 is produced, which system transmits the respective faults, which have been learned from individual faults when transmitting the fault logs, to other plug-in cards 72.

In this case, the additional devices may be activated in the "read" or "read/write" mode. In this case, the size of the data memory is determined by the size of the file and is freely configurable. A file may be transmitted by a host computer 74 through the interface 30 and may be addressed by another computer via the local network. A USB mass memory may be made available to the basic I/O system when starting the system and may be used to provide another operating system if necessary by means of plug-in cards 72 or to access another operating system if necessary.

An Ethernet interface 64 is the standard interface provided for implementing remote maintenance but other interfaces (for example UMTS, ISDN, etc.) may also be used if this should turn out to be necessary. In this context too, the USB standard constitutes a generic interface which, with the corresponding device drivers, allows access to a large number of further external devices, that is to say allows the latter to be connected.

The device 72 which is preferably in the form of a plug-in card can internally obtain the necessary operating current from the host computer 74 in a plurality of different ways via a plurality of different internally provided redundant power supply units 61 under normal operating conditions. It is also possible to ensure the power supply solely by means of an external power supply unit, that is to say an external power supply 60, if the host computer 74 cannot provide any supply. The supply voltage can be internally obtained by means of the "stand-by" mode of the host computer 74. This can take place either by means of a wake-on-LAN (WOL) connection or a USB master connection or by means of a connection involving the "stand-by" signal from the power supply unit or the "stand-by" signal from the bus 7. It is also possible to supply the device 72 which is preferably in the form of a plug-in card by means of a battery or a rechargeable battery which can be charged by the host computer 74 in order to bridge relatively short power failures if necessary.

In order to ensure "reset" and/or "on/off" control of the host computer 74, the device 72 which is preferably in the form of a plug-in card is looped into the external standard cables, that is to say is electrically connected. This is made possible, for example, by a "Y jumper cable" or a connector for the plug-in card 72.

The device 72 which is preferably in the form of a plug-in card supports a number of different sensors in order to observe different operating states of the computer-aided system or the host computer 74 and in order to indicate imminent failures in good time. A standard set of sensors has already been implemented on the plug-in card 72 or on an external sensor board 66. The standard set of sensors 68, 69 allows the temperature or fan speeds to be measured, to name two examples. The temperature of the plug-in card 72 itself is measured by a sensor close to the power supply unit. In addition, the plug-in card 72 allows additional sensors to be added using simple expansion cards. The additional sensors are managed by a microprocessor and communicate with the plug-in card 72 via the generic input and output unit 47. The following sensors are currently available:

Temperature sensors for particular measuring points in the host computer 74; these include additional high-power cards, power supply units, fans for cooling the processor, vibration meters, smoke detectors, etc.;

Sensors for measuring the correct method of operation of fans; these are usually already present in computers and the data from the tachometers which are usually used are connected to the motherboard of the host computer 74. However, the data acquired here cannot be read via standardized interfaces. Therefore, it is appropriate to directly tap off the speeds in order to carry out independent monitoring. However, this means a considerable amount of additional cabling since the existing fan cable must also be connected to the device 72 and, from there, must also be connected to the motherboard of the host computer 74. Considerable additional costs arise here. The signals from the tachometers can also be obtained capacitively by simply pairing a sensor wire or a corresponding sensor antenna to the tachometer signal. The original wiring of the host computer 74 is not changed in this case.

"Intrusion sensors" for determining whether the system has been opened even when the host computer 74 is switched off;

Noise sensors, for example microphones, for detecting particular unusual noises, which include, inter alia, the rotors of hard disks and fans, the bearings of which are worn out, and could thus indicate early failure;

Sensors for detecting possible failure of redundant power supply units. Each redundant network typically routes an internal supply voltage reference signal to the outside. These signals are connected to the internal ADC of the device 72. If a power supply unit fails, the host computer 74 will continue to run but the corresponding reference signal disappears and allows the device 72 to respond quickly.

Mention should also be made of motion sensors which can be used to detect whether a computer-aided system or a host computer 74 has been physically moved.

The measured values from all of the sensors 68, 69 mentioned above by way of example are periodically measured and compared with previously stored reference values. If one of the measured values undershoots or exceeds a previously programmed threshold value, this is transmitted to a centralized system 100 by the device 72 which is preferably in the form of a plug-in card. If this problem cannot be rectified by the system 100 itself, the apparatus 72 can initiate corresponding measures which help to avoid permanent damage to the host computer 74. In the simplest case, this host computer 74 is switched off.

The mass storage media in computer systems are one of the locations which are frequently affected by failures. This can be attributed, on the one hand, to the relatively frequent data access and, on the other hand, to the fact that these media have movable parts. In this case, the lifetime of a hard disk is influenced, in particular, by the operating temperature. Many hard disks therefore have factory-fitted internal sensors for measuring the operating state. However, in practice, files can be read only using specific additional software which is also often specific to the manufacturer and not available for every operating system. The device 72 (RAS optimizer) which is proposed according to the invention and is preferably in the form of a plug-in card allows important status information relating to hard disks to be externally read using its own sensors 68, 69. For this purpose, a temperature sensor and a microphone may be mechanically directly connected to the hard disk. If "hot swap" housings are used, the sensors are fastened to the connecting plugs using a spring system in order to ensure a direct and permanent fit on the hard disk. In the present context, a "hot swap" housing denotes a housing which makes it possible to remove hard disks during ongoing operation of a computer system. This form of fastening thus allows the temperature and the noise emission of a hard disk to be independently measured. As a result of the direct contact between the microphone and the hard disk, the ambient noises do not result in any relevant impairment in the noise level to be measured. In this case, it is sufficient if the sound is respectively recorded for only a short amount of time (only a few seconds) and the spectrum is then analyzed by a fast Fourier transformation (FFT) in the processor 40. In this case, any mechanical deviation will change the noise spectrum and will thus allow an approaching failure to be detected.

Many high-quality computers in the server field have generally implemented a generic interface in order to read and control internal operating and service parameters. This interface is typically based on a serial protocol and is accessible via a special port which is generally not standardized on the host printed circuit board, that is the say the host computer 74. In this case, the associated instructions, commands and messages are likewise not standardized. In order to gain access to an IPMI (Intelligent Platform Management Interface), a dedicated interface 70 for transmitting and receiving IPMI-relevant data and control sequences is implemented in at least one expansion unit 66 for connecting further sensors or drive units, which interface has a functionality similar to that of the sensor expansions. A corresponding database for the parameters of particular host computers 74 and those of IPMI protocols has been set up and is maintained.

The host system, represented by the host computer 74, in which the device 72 which is preferably in the form of a plug-in card is installed, produces a number of start messages which are output at the standardized port 80, the filter 24. These transactions, that is to say bus-relevant transactions, constitute broadcasts which are output by the host computer 74 without flow control with a terminal on the bus 7 of the host computer 74 and are concomitantly read by the plug-in card 72 via the SNOOP unit 20. As described at the outset, the SNOOP unit 20 has the task of receiving general, non-target-specific data from the bus 7 of the host computer 74. The respective coding of the messages intended for the filter 24 (port 80) is not standardized and is therefore specific to the manufacturer. A database which records corresponding information is periodically updated such that the correct assignments are ensured in order to generate automatic interpretations of the messages. The respectively detected port-80-relevant messages, that is to say messages which are intended for the filter 24, are listed, stored and provided for analysis by the device 72 which is preferably in the form of a plug-in card.

Configuration is possible via the SNOOP unit 20, which could also be referred to as a concomitant reading unit, such that this SNOOP unit 20 records PCI or PCI-X signals and states corresponding to the latter and thus operates as a PCI signal recorder in the sense of a tracer. In a manner similar to the filter 24 (synonymous with a port-80 scanner), the PCI, PCI-Express or PCI-X signals are kept in internal memories. Corresponding trigger states (triggers) for addresses or data values on the address line of the bus 7 can be implemented in a very simple manner, with the result that the plug-in card 72 can also act as a low-level bus monitor or debugging unit. On account of this property, every activity in the host computer 74 which affects the peripheral bus 7 can be recorded without impairing operation. In this case, the bus traffic which is transmitted in the same PCI, PCI-Express or PCI-X bus segment can be respectively recorded.

In order to implement a diagnosis functionality of the hardware, an optional master interface, compare reference symbol 35, was implemented. Item 35 denotes a bus master unit of the apparatus 72 for the bus 7 of the host computer 74, which unit is provided by the plug-in card 72. The interface 35 is not needed for a remote maintenance functionality but can be used to access any hardware expansion of the host computer 74. For example, it is possible to carry out memory tests on the host computer 74 directly in the memory 2 of the host computer 74. Corresponding drivers can be loaded and can be installed on the components in the host computer 74. In this mode, the plug-in card 72 adopts a host functionality by switching off the processor of the host computer 74 so that it does not interfere with communication. For example, it is possible to load a network device driver and to communicate via the network interface of the host computer 74 or to check the hardware functionality, including direct reading of the Ethernet Media Access Control (MAC) address and the configuration of the Ethernet. In a corresponding manner, it is possible to likewise access the interface of the mass memory of the respective host computer 74. A further feature of the interface to the bus 7 is the possibility of directly searching the bus 7 for available devices in order to thus determine the identity and the current configuration of the host computers 74 in the starting phase.

The correct basic I/O system (BIOS) configuration of the host computer 74 is a basic prerequisite for correct operation and for successful implementation of the configuration and successful data interchange. However, the configuration may change decisively as a result of hardware or software faults, for example as a result of an empty battery. A known way of verifying and possibly reconfiguring the settings of the basic I/O system (BIOS) is to use an HID (Human Interface Device) USB device in order to set the settings during the starting operation and to automatically check and possibly modify the corresponding settings by means of the graphics output. The USB starting operation can be used to respectively update the basic I/O system (BIOS) by means of manufacturer updates and to keep the system updated. If the BIOS itself is no longer functional, the host computer 74 can no longer start. In this case, the bus master interface 34 can be used for recovery. The bus master 35 allows all devices to be directly read and written to, including the BIOS flash memory which is installed in the host computer 74. Reading the BIOS flash memory of the host computer 74 allows a detailed examination of the contents thereof and configuration in relation to settings which have already been determined. In this case, this procedure is faster than the above-described method using HID (Human Interface Device) USB by orders of magnitude. If the BIOS operating system is completely non-functional, this reading/writing possibility can be used to write to the BIOS flash memory of the host computer 74 again using the plug-in card 72. In this case, the programming sequences for the BIOS flash memory are generally well documented and follow a standardized procedure.

Many networks which are remotely administrated operate in areas where additional external Ethernet switches or ports or the like are either not available or are undesirable. In order to circumvent the need for a second network connection for the plug-in card 72, a multi-port Ethernet bridge 41 can optionally be used. The use of a multi-port Ethernet bridge 41 supports a plurality of functions: first of all, the network of the host computer 74 can be directly connected and it is thus possible to generate a local subnetwork which has a connection to the outside world and has at least two internal interfaces 64, 65 for the host computer 74 and the plug-in card 72. With this method, it may be necessary to accordingly configure the upstream network components. As a result, the plug-in card 72 may be used as a hardware-implemented firewall of the computer since the plug-in card 72 analyzes each data packet intended for the host computer 74 and examines it for viruses, malicious software, Trojans etc. The disadvantage of this method is the fact that both units share the same physical network connection, which may result in access conflicts. However, the plug-in card 72 supports an encrypted VPN connection, which eliminates this disadvantage again.

A configuration which is also typical is, for example, the installation of a large number of host computers 74 with associated plug-in cards 72 in a 19-inch cabinet, for example. One option is the decentralized arrangement of a local switch for the network comprising a number of plug-in cards 72, the switch then establishing a connection to higher network layers via redundant ports. This configuration requires an additional switch which, although it may be cost-effective, nevertheless constitutes additional hardware and costs. In a different configuration, the plug-in cards 72 are interconnected in a computer cabinet. This is effected by connecting the devices 72 which are preferably in the form of plug-in cards in pairs via the Ethernet bridge 41. For the purpose of redundancy, the start and end of the chain are typically connected to the respective superordinate network layer in this case, the plug-in card 72 being configured in such a manner that it does not interrupt the chain in order to prevent a network loop. In the event of a failure in the chain, the interrupt bridge is accordingly shifted to the last position which can be reached from both sides.

This configuration is checked by periodically running software processes and is automatically adapted if necessary. In this case, the configuration is equivalent to the version with separate switches as long as fewer than two cards or network connections are disrupted. In the configuration with a separate switch, only the disrupted devices 72 which are preferably in the form of plug-in cards cannot be reached, whereas, in the variant with a network loop, all plug-in cards 72 between the two defective plug-in cards 72 could no longer be reached. Therefore, when high demands are imposed on the failure safety, that is to say on the highest degree of availability of the network, two ports of the apparatus network can be used and can be connected to two independent additional devices (RAS optimizers) 72 which are in the form of plug-in cards.

The use of the Ethernet bridge 41 allows elegant implementation of additional security aspects in the host computer 74 since all data packets from the host computer 74 pass through the Ethernet bridge 41. A packet filtering mechanism is introduced on each network layer without influencing the host computer 74 or even installing additional software on the system. In addition, the host computer 74 need not be occupied with the security task. The plug-in card 72 is typically attached in such a manner that it allows very secure and limited access. In addition, the configuration may be rendered static by the flash configuration memory 44 being set only as a read memory, that is to say operating in a unidirectional manner.

Reference symbol 65 is used to denote a second network connection of the RAS optimizer 72 which is proposed according to the invention and is preferably in the form of a plug-in card. The host computer 74 is connected to said second network connection. The second network connection 65 of the host computer 74 is connected to the second network connection 65. As a result, all data flow through the plug-in card 72 which is proposed according to the invention and is used as an RAS optimizer. This card checks the data for viruses and sends them into the network via the primary network connection 64. The method in the other direction takes place in a similar manner, that is to say the data or data packets intended for the host computer 74 are passed, via the primary network connection 64, to the RAS optimizer 72, are checked there and are optionally transmitted to the host computer 74 via the further, second network connection 65.

Any virus or other malicious software which would infect the host system does not have an opportunity to modify the security system since all network functionalities are controlled via the network bridge 41 of the plug-in card 72. The functionality of the Ethernet bridge 41 also allows any type of virtual connection or tunnel configuration such as VPN connections to defined computers or networks. This configuration does not require any additional software or additional settings in the host computer 74 and, furthermore, there is also no opportunity for the host computer 74 to directly change any security-relevant or network-relevant configuration unless it is carried out by the network 100.

The Ethernet bridge 41 which is also referred to as a network bridge allows the security and network infrastructure to be completely separated from the configuration of the host computer 74. It is possible to implement a corresponding monitoring functionality which detects any potential threat to the host system, whether by viruses or other malicious software, and independently initiates countermeasures such as blocking the affected host computer 74 from the network or restricting access to said computer.

Following a network failure, it may be the case that a host computer 74 no longer starts. In most cases, this is caused by different errors in the starting or basic 110 system parameters. A checksum error in the BIOS configuration normally requires user intervention by using an HID (for example the keyboard) to initiate the restoration or reconstruction of the BIOS parameters using past parameters. Many other starting problems can be directly eliminated by resetting the machine. The plug-in card 72 dictates the reset counter of the starting process. In the event of a starting fault which results in the cessation of the starting process, the device 72 which is preferably in the form of a plug-in card automatically initiates countermeasures in order to change the system to the operating state again. These include the recovery of the BIOS parameters, the transmission of a reset pulse to the host computer 74 or the initiation of a new switch-on procedure. If no success can be achieved after a number of repetitions, a complete self-test of the host computer 74 is carried out and a corresponding test system is loaded into the host computer 74. Faults are then rectified if possible or, if it is not possible to rectify faults, the fault is escalated according to the stipulations, a system administrator is informed via e-mail or SMS or the host computer 74 is switched off.

If the host computers 74 are restarted, large installations require the supply voltage not to be simultaneously connected for all host computers 74. Furthermore, following a power failure, the host computers 74 should not be immediately switched on again but rather sufficient time should have elapsed before a stable power supply is established again. This is particularly important for all mass memories, for example hard disk systems. The host computer 74 is configured in such a manner that it remains switched off when the power supply is available again. The plug-in card 72 starts automatically if it was not kept in operation by an uninterruptible power supply device. Since the plug-in card 72 (RAS optimizer) has at least one non-volatile mass memory 45 (flash), interrupted starting processes generally do not have a negative influence. Following the switch-on process, the plug-in card 72 begins to check the power supply and, if the latter is stable over a defined period of time, the power supply for the host computer 74 is connected. In larger scenarios, the plug-in card 72 uses an auto-negotiation scheme to ensure that only a predefined number of host computers 74 can be respectively switched on at the same time. In this case, this switch-on scheme takes into account the power and segmentation of the existing power supply infrastructure.

The graphics function of the RAS optimizer 72 is implemented as a combination of a freely programmable processor 34 and software drivers which executes commands from the entire system and writes the corresponding data to the graphics memory 43.

In this case, each instruction from the host computer 74 to the graphics unit 64 is recorded in an instruction queue. The instruction queue 24 (port 80) is used to be able to read and evaluate generic fault messages from the host computer 74. In this manner, the plug-in card 72 need not search the complete graphics memory, that is to say the area reserved for the graphics data in the volatile memory 42, but rather receives all instructions directly. This mode is particularly advantageous when the graphics output is in the ASCII mode and the instructions can be directly interpreted. In other graphics modes as well, the plug-in card (RAS optimizer) 72 can directly read update instructions and can, for example, restrict updating only to subareas of the graphics memory 43. If the graphics instruction contains a text message, the latter can be read by reading the pixels in the graphics memory and correspondingly interpreting them using OCR (Optical Character Recognition) software. This reduces the graphics content to the actual text message. This method has the advantage over standard OCR methods that the interpretation of the direct digital graphics does not have any distortion or smearing and the area in which the text is located is already known. Furthermore, there is no need to search the entire graphics page again in order to decode individual letters or short word sequences, which accordingly drastically reduces the effort needed for the OCR calculation. The device 72 which is preferably in the form of a plug-in card automatically produces an ASCII output stream for all graphics outputs containing passages of text.

For a particular character set, a particular letter can be recognized in its constant update sequence and thus constitutes one possible way of carrying out an intelligent word comparison with the aid of the CPU 34, that is to say the graphics processor 34 of the plug-in card 72. This can be implemented either using a microprogram or as an extended coprocessor instruction. If new character sets arise, their patterns can be recognized by the OCR functionality and the list of known word patterns can be supplemented with the patterns which have recently arisen. In this manner, the device 72 which is preferably in the form of a plug-in card can be adapted to any character set and graphics text in a type of learning mode. The generated text can then be examined for predefined words or terms, for example "kernel panic" or "fatal error".

Different states may definitely result in a sudden crash of the system without outputting diagnostic information such as "core dumps". These faults are generally typically difficult to reproduce since they firstly rarely occur and are often caused only by a number of circumstances which are difficult to reproduce. The case of such a serious system fault can be detected by the plug-in card 72 either by means of an appropriate interpretation of the data in the graphics memory area 43 of the volatile memory 42 or by the loss of the "heartbeat monitoring" of the host computer 74. Since the plug-in card 72 has full access to the physical memory 2 of the host computer 74, a subsequent complete memory dump can be initiated in this manner. Assuming the use of corresponding loss-free compression techniques, the memory 2 can be set to a predefined secure communication status again. In addition, all relevant diagnostic information and system states of the system are output for fault diagnosis and are transmitted, for example, to the monitoring system which makes these fault logs available to other RAS optimizers 72, with the result that a learning system is generated. Corresponding messages or signal sequences which indicate the crash of the host computer 74 are escalated and the host computer 74 is automatically restarted after carrying out a complete self-test.

As already explained several times above, the plug-in card 72 supports hierarchical system analysis. At the lowest hierarchical level, the port-80 functionality of the filter 24 and the PCI bus master mode 35 can be used to test the operating state of every important hardware component of the host computer 74, including the BIOS flash memory and the dynamic memory 42, that is to say the volatile memory. Every fault at this level is either automatically repaired (for example BIOS CRC faults) or, if the fault cannot be automatically rectified (for example faults in the SIM memory), a detailed fault report is output so that the system administrator can directly replace the defective component(s) without having to make his own diagnoses.

Following a successful self-test, the host computer 74 may be instructed to load a test operating system. Relatively little hardware is required for this purpose and the hardware is essentially restricted to a power supply unit, the BIOS and the main memory. Neither the network nor the mass memory must be operating for this purpose. Instead of the normal starting device such as an internal hard disk or a network interface, the process is started from a drive virtualized by the plug-in card 72. A tried and tested medium for such a test operating system is, to name one example, KNOPPIX which allows a complete Linux system to be started without changing the starting parameters of the host computer 74. After the test operating system has been started, a number of test routines are started. These tests include the detailed checking of the memory 2, the reading of all blocks of the hard disks, the comparison of starting parameters with stored reference parameters, the testing of network connections and the testing of all additional hardware components. The use of an independent operating system allows detailed testing and accurate fault diagnosis of the hardware infrastructure of the host computer 74 under the supervision and management of the plug-in card 72. After a successfully passed test and possible repairs, the system is restarted. In this case, the results of the previously performed self-test are recorded. This functionality is not only suitable for dealing with problems but can also be carried out for the purpose of quality control or for scanning for viruses in the host computers 74.

In large installations, new computers should be incorporated into an existing infrastructure as quickly and simply as possible. The automatic self-test described above is very helpful in this case. After the plug-in card 72 has been installed in the host computer 74, the latter independently registers with the network and automatically carries out all self-tests and acceptance tests. The checking of the existing chipsets or other hardware components can be mentioned here as part of the tests. If faults occur, this is reported and the system is shut down. Furthermore, the plug-in card 72 as an RAS optimizer can compare all found hardware with a database and can check whether all ordered components are present.

The installation of the host computer 74 is the next step in the start-up operation. The system parameters such as the MAC address and the process identification are known as part of the self-test. These parameters are used to automatically register the host computer 74 with the network infrastructure. The basic I/O system is then configured and an installation agent is started or initialized via the USB mass memory functionality. This agent initiates the hard disks, copies the selected software and then configures and personalizes the latter. The host computer 74 is then started with the internal operating system. The sequence in which the acceptance test, configuration and installation are carried out is fully automated in this case and it is necessary only to install and wire the plug-in card 72 itself.

The plug-in card 72 (RAS optimizer) comprises at least one serial access for tapping off activities in a serial channel. Further sensors which are addressed via a serial protocol may thus be connected to the RAS optimizer which is proposed according to the invention and is in the form of a plug-in card 72. The screen output is also diverted to the serial console in some computers.

Some functions require additional cabling; for example, a jumper cable which runs between the USB jumper of the motherboard of the host computer 74 and the plug-in card 72 may be required for the HID USB interface. This is necessary since some host computers 74 recognize an HID USB device as their primary USB device only when it is present when starting the system. In order to render the mentioned jumper cable superfluous, the plug-in card 72 may act as a multifunction device with a virtual USB chipset and simultaneous graphics card. In this case, the USB slave interface simulates a connection to the HID USB. If this is supported by the host computer 74, the device is recognized during the starting phase and is incorporated into the system. A further functionality which can be adopted by the plug-in card 72 is that of a host network interface. In this case, the apparatus acts as a generic PCI, PCI-Express or PCI-X network card which forwards any network traffic to its private interface. However, in this mode, it may be necessary to use drivers which are dependent on the operating system.

The method of operation of the sensors and the sequence of repair steps in the autonomously operating device, which is proposed according to the invention and is intended to autonomously diagnose and remotely control a computer, are as follows:

If temperature sensors are used, a temperature exceeding the set predefined limit value can be detected. In this case, the speed of a fan can be increased in order to lower the temperature, and a corresponding item of information can be transmitted via the monitoring system 100. If the monitoring system 100 receives a plurality of messages relating to an increased temperature within a short period of time, for example, this may indicate a failure of an air-conditioning system in a computing center. The monitoring system 100 can send corresponding information to a system administrator either via e-mail or else by transmitting an SMS and requests the connected RAS optimizers 72 to shut down the host computer(s) 74 if necessary in order to avoid further damage.

If the reset sensor receives multiple reset signals in succession, that is to say within a few minutes, the plug-in card 72 will inform the system administrator to that effect and, depending on the stipulation, will carry out a self-test of the at least one host computer 74 or the host computers. This is effected by the plug-in card 72 starting a test operating system in the at least one host computer 74 and testing the individual hardware components, for example CPUs, memory units and the like. The administrator is provided with a resultant test report on the workstation computer 101 and, in the event of a hardware defect, the defective component is named. If, in contrast, there is no hardware defect, the operating system of the at least one host computer 74 is autonomously renewed depending on the stipulation and the application programs are reinstalled.

Combining a plurality of sensor messages makes it possible for the autonomously acting plug-in card to infer new disruptive factors: an imminent hard disk defect can be inferred from an overtemperature of a storage medium, for example a hard disk, which is determined using a temperature sensor, and by detecting changed background noise, which can be detected using a noise sensor, for example a microphone, inside a host computer 74 and data backup on this corresponding hard disk can be started as a precaution.

A vibration sensor and a sensor which detects a "housing is open" position are used to detect that someone is just about to remove the at least one host computer 74 from its anchoring arrangement. If this at least one host computer 74 is in an ATM, for example, a conceivable action would be the triggering of an alarm and, via an actuator, the lowering of the money stock into a protective area under the ATM and, if appropriate, the alerting of appropriate task forces.

It is also possible to infer a fire in the room in which the at least one host computer 74 is installed by combining the signals emitted by gas or smoke sensors and by an overtemperature determined using the temperature sensor. In this case, depending on the stipulation, the power could be autonomously disconnected at the at least one host computer 74 in order to avoid further damage.

LIST OF REFERENCE SYMBOLS

1 Host computer CPU
2 Host computer memory
3 PCI, PCI-X, PCI-Express graphics card
4 AGP graphics card
5 Host computer chipset
6 Host computer USB master/slave, part of 5
7 PCI, PCI-X or PCI-Express bus of the host computer 74
20 SNOOP unit of the plug-in card 72 for recording general, non-target-specific data from the PCI, PCI-X or PCI-Express bus of the host computer 74
21 Tracer unit of the plug-in card 72 for being able to read commands, data and addresses not intended for the plug-in card 72 from the PCI, PCI-X or PCI-Express bus of the host computer 74
22 FIFO for the PCI, PCI-X or PCI-Express data not intended for the plug-in card 72
23 FIFO for data from the port-80 scan
24 Port-80 filter for being able to read and evaluate generic fault messages from the host system
30 PCI, PCI-X or PCI-Express slave unit of the plug-in card 72
31 Generic control and status registers for the PCI, PCI-X or PCI-Express bus of the host computer 74, which registers are provided by the apparatus 72
32 Control and status registers for the PCI, PCI-X or PCI-Express bus of the host computer, which registers are provided by the apparatus for the graphics unit
33 FIFO for graphics data 34 Graphics processor of the plug-in card 72
35 Bus master unit of the plug-in card 72 for the PCI, PCI-X or PCI-Express bus of the host computer 74, which unit is provided by the plug-in card 72
40 Processor
41 Network connection with at least one connection
42 Volatile memory
43 Graphics memory (implemented in 42)
44 Drive unit of the non-volatile memory
45 Non-volatile memory which can retain data without a power supply
46 Drive unit of the volatile memory
47 Generic input and output unit
48 USB master/slave unit
49 Virtual boot flash for providing the host computer 74 with amended data during starting (implemented in 42)
50 Local bus in the RAS optimizer, master/slave-enabled
60 External power supply
61 Three different internal redundant power supplies
62 One or more serial connections for establishing a connection to the host computer 74 or to external components
63 Connections for switching loads or reset signals from the host computer 74 or the components of the latter
64 Primary network connection for interchanging data with the plug-in card 72
65 Optional secondary network connection for filtering the network of the host computer 74 or for implementing a redundant network connection of the plug-in card 72
66 One or more expansion units for connecting further sensors or drive units
67 Microprocessor for preprocessing sensor data
68 Additional generic interface with digital and analog inputs and outputs for connecting any desired sensors
69 Connections for a microphone, a vibration detector, a smoke detector, an acceleration detector, digital and analog temperature sensors and "housing was opened" detectors
70 Interface for transmitting and receiving IPMI data and control sequences
71 Connection for measuring and regulating fan speeds
72 Apparatus (plug-in card, RAS optimizer)
73 Sensor array on the plug-in card 72 for connecting sensors 68, 69, 70 and 71
74 Host computer in which the plug-in card 72 (RAS optimizer) is installed
100 Monitoring system which collects, displays and distributes information from a plurality of plug-in cards 72
101 Administrator's workstation computer
110 General data and control and communication channels, network

The invention claimed is:

1. An autonomous device for autonomously diagnosing and remotely controlling a computer or a computer-aided system with a local bus to which the autonomous device is connected, wherein the device autonomously monitors the status of a host computer with the aid of sensors and independently initiates correction steps and is incorporated in a monitoring system which monitors the device and a number of additional devices and forms a learning system by virtue of fault logs of the device and the additional devices being interchanged.

2. The autonomous device as claimed in claim 1, further comprising at least one first network connection, via which bidirectional data transmission with a monitoring system takes place, for the purpose of interchanging state logs and repair mechanisms.

3. The autonomous device as claimed in claim 1, further comprising an encryption functionality which encrypts all data which are interchanged with the network by the device.

4. The autonomous device as claimed in claim 1, wherein the data are interchanged between the device and the monitoring system by means of a VPN (virtual private network).

5. The autonomous device as claimed in claim 1, wherein the network connection of the host computer is connected to a second network connection of the device, and the device undertakes all necessary VPN transactions for the host computer and simultaneously filters all network packets for the host computer, the device constituting a VPN router with an integrated firewall functionality which is completely independent of the operating software of the host computer.

6. The autonomous device as claimed in claim 1, wherein the sensors include temperature sensors, fan speed sensors, I/O signal sensors, reset sensors, microphones, vibration sensors, gas sensors, motion sensors, infrared sensors, humidity sensors, smoke sensors, actuators, distance sensors, overvoltage and undervoltage sensors, current sensors and primary supply sensors.

7. The autonomous device as claimed in claim 1, wherein the available sensor signals are read and processed.

8. The autonomous device as claimed in claim 1, wherein available signals from redundant power supply units are read independently in order to independently detect a network failure.

9. The autonomous device as claimed in claim 1, wherein the device includes an integrated graphics card functionality and has at least one additional interface for connecting at least one multifunction device.

10. The autonomous device as claimed in claim 1, wherein the device has an additional interface for connecting at least one multifunction device comprising at least one of: a keyboard, a mouse, an HID (Human Interface Device), a USB mass memory, a CD-ROM, a CD-RW, a DVD and a DVD-RW.

11. A method for diagnosing and remotely controlling a computer or a computer-aided system with an autonomous device as claimed in claim 1, wherein the autonomous device autonomously verifies and, if necessary, configures or reconfigures the host computer.

12. The method as claimed in claim 11, wherein, in the event of problems with starting the host computer, the host computer is automatically started via the device.

13. The method as claimed in claim 11, wherein a controlled start-up of the host computer is carried out by means of switch-on signals following an interruption in the power supply.

14. The method as claimed in claim 11, wherein a network which incorporates the device transmits graphics-relevant data to a workstation computer and vice versa.

15. The method as claimed in claim 14, wherein keyboard and mouse commands are additionally transmitted, via the network, from the workstation computer to the device which then forwards them to the host computer.

16. The method as claimed in claim 11, wherein a controlled start-up of the host computer is triggered by the device by means of controlled switch-on signals following autonomous verification and configuration of the host computer.

17. The method as claimed in claim 11, wherein graphics-relevant data are filtered for textual elements.

18. The method as claimed in claim 11, wherein graphics-relevant data are interpreted by means of pattern recognition of word groups.

19. The method as claimed in claim 11, wherein graphics-relevant data are interpreted by means of OCR screening at the letter level.

20. The method as claimed in claim 11, wherein the device is implemented in the host computer and carries out at least one automatic self-test.

21. The method as claimed in claim 11, wherein the device is implemented in the host computer and makes it possible to automatically start up the host computer.

22. The method as claimed in claim 11, wherein the device generates a memory dump image.

23. The method as claimed in claim 11, wherein different diagnosis and repair functions, including tests and resets of the host computer, are carried out in response to autonomously detected abnormal operating conditions.

24. The method as claimed in claim 11, wherein at least one diagnostic log is buffered in at least one permanent memory of the host computer.

25. The method as claimed in claim 11, wherein the device transmits a diagnostic log to a monitoring system.

26. The method as claimed in claim 11, wherein a diagnostic log is stored in the device itself.

\* \* \* \* \*